(12) United States Patent
Fu et al.

(10) Patent No.: US 6,581,713 B2
(45) Date of Patent: Jun. 24, 2003

(54) ENGINE SUSPENSION DEVICE OF A BEACH BUGGY

(75) Inventors: Judge Fu, Tainan Hsien (TW); Michael Yu, Tainan Hsien (TW)

(73) Assignee: Aeon Motor Co., Ltd., Tainen Hsien (TW)

( * ) Notice: Subject to any disclaimer, the term of this patent is extended or adjusted under 35 U.S.C. 154(b) by 0 days.

(21) Appl. No.: 09/994,717

(22) Filed: Nov. 28, 2001

(65) Prior Publication Data

US 2003/0098195 A1 May 29, 2003

(51) Int. Cl.[7] .............................. B60K 8/00; B62D 21/00
(52) U.S. Cl. ......................................... 180/291; 180/312
(58) Field of Search .................................. 180/291, 311, 180/312, 55, 57, 58, 59, 60, 61, 62, 63; 296/187; 280/781, 298, 299, 301; D12/159

(56) References Cited

U.S. PATENT DOCUMENTS

| | | | | |
|---|---|---|---|---|
| 4,593,785 A | * | 6/1986 | Yamamoto et al. | 180/291 |
| 4,809,801 A | * | 3/1989 | Enoki et al. | 180/228 |
| 5,915,495 A | * | 6/1999 | Kerlin et al. | 180/291 |
| 6,056,077 A | * | 5/2000 | Kobayashi | 180/216 |
| 2002/0033296 A1 | * | 3/2002 | Ohyama et al. | 180/312 |

FOREIGN PATENT DOCUMENTS

| | | | | |
|---|---|---|---|---|
| JP | 01212684 A | * | 8/1989 | 180/219 |
| JP | 04358984 A | * | 12/1992 | 180/65.5 |
| JP | 05065091 A | * | 3/1993 | 180/219 |

* cited by examiner

Primary Examiner—Brian L. Johnson
Assistant Examiner—G B Klebe
(74) Attorney, Agent, or Firm—Bacon & Thomas, PLLC (57) ABSTRACT

An engine suspension device of a beach buggy includes a car frame composed of metal rods welded together, an engine hanger, an engine supporter and an auxiliary hanger. The car frame is formed with an interior space. The engine hanger has its upper portion pivotally fitted with the support lugs of the car frame, while the auxiliary hanger has its top ends pivotally combined with the pivotal bases of the car frame and its bottom end pivotally connected with the support frame of the engine supporter, letting the engine supporter and the engine hanger respectively extending into the interior space of the car frame. Then an engine is placed inside the car frame, and the engine hanger together with the engine supporter is pivotally combined with the casing of the engine, lessening vibration of a beach buggy, and preventing the transmission chain from becoming loosened and worn out and the car frame from twisting sideward.

4 Claims, 12 Drawing Sheets

ENGINE SUSPENSION DEVICE OF A BEACH BUGGY

BACKGROUND OF THE INVENTION

This invention relates to an engine suspension device of a beach buggy, particularly to one capable to lessen vibration, to guard a transmission chain from becoming loosened and worn out and to prevent the car frame from twisting laterally and the buggy from overturning sideward when a beach buggy is running.

Figure 1:
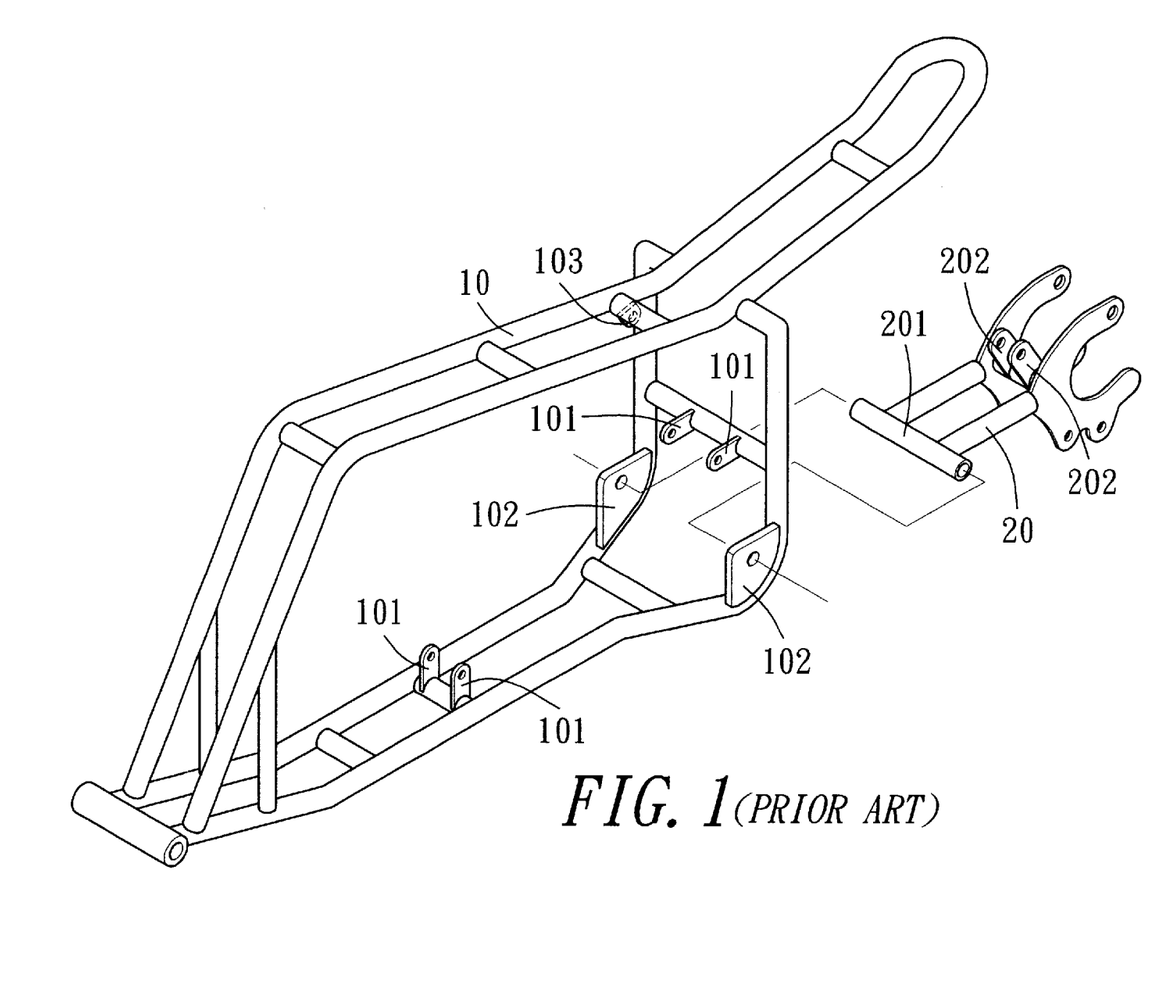
FIG. 1 is a perspective view of the car frame of a conventional beach buggy.

The frame structure of a conventional beach buggy, as shown in FIG. 1, includes a car frame 10 composed of a plurality of metal rods welded together and a rear wheel frame 20. The car frame 10 has a pair of fixing lugs 101 respectively provided on the lateral frame at the bottom and on an upright frame at a rear side, a pivotal base 102 provided respectively on the opposite bending portions of the bottom lateral frame and a pivotal lug 103 provided on the top frame near a rear side. The rear wheel frame 20 has a lateral combining rod 201 fixed on the front end and a pair of pivotal lugs 202 on the upper side.

Figure 2:
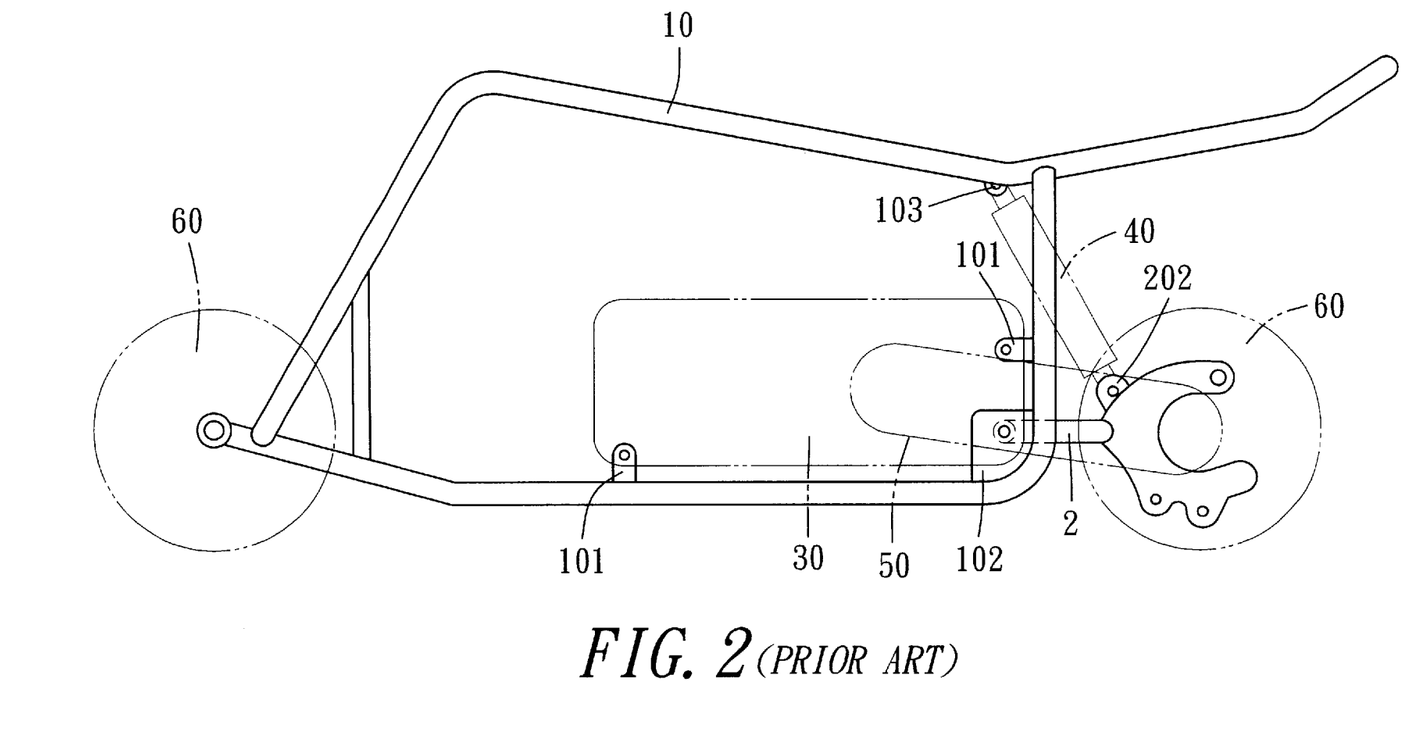
FIG. 2 is a cross-sectional view of the car frame and the engine combined together of a connectional beach buggy.

In assembling, the combining rod 201 of the rear wheel shaft frame 20 is pivotally fitted between two pivotal bases 102 of the car frame 10, as shown in FIG.2, and subsequently an engine 30 is placed in the interior space of the car frame and secured with the fixing lugs 101. Then, a shock absorber 40 is pivotally provided between the car frame 10 and the rear wheel shaft frame 20 to let a beach buggy have a function of shock absorption. Besides, a transmission chain 50 is fitted between the rotating shaft of the engine 30 and the shaft rod of the rear wheel 60 so as to permit the engine 30 to drive the rear wheel 60 rotate and run forward.

However, the conventional device described above has the following disadvantages.

1. The engine 30 is directly fixed on the car frame 10 so that when the engine 30 rotates and vibrates, it will directly make the car frame 10 vibrate, too, giving rise to discomfort to a rider.

2. Vibration may become increasingly strong due to an abrupt vibration caused by the engine 30 rotating at a high speed, easily making the assembling bolts loosened and fall off in case of the vibration lasting for a long time.

3. The vibration of the car frame 10 and the engine 30 may alter the distance between the rotating shaft of the engine 30 and the shaft of the rear wheel 60, easily rendering the transmission chain 50 loosened and worn out.

SUMMARY OF THE INVENTION

The objective of the invention is to offer an engine suspension device of a beach buggy, capable to lessen vibration and prevent the transmission chain from loosened and worn out and the car frame from twisting sideward.

The engine suspension device of a beach buggy in this invention includes a car frame composed of a plurality of metal rods welded together, an engine hanger, an engine supporter and an auxiliary hanger combined together.

The car frame with an interior space has a fastening member with threaded holes fixed protruding on opposite outer sides near the front end of the top rods, and a support lug with a through hole provided under the fastening member and having a rectangular block fixed behind the support lug. Further, a fixing plate is screwed on the outer side of the fastening member as well as on the support lug, and a pivotal base with a downward opening is fixed respectively on opposite top rods near a rear end of the car frame.

The engine hanger has an upper connecting rod provided with a stop plate at opposite ends, with each stop plate having a combining member to be inserted in the support lugs under the fastening member and a hollow connecting rod provided at the bottom.

The engine supporter is formed with two rods extending forward and respectively having a protruding-out connecting stud at the front end and has a pair of support arms secured on the upper side, extending forward above the rods and respectively having connecting lugs at the front end. Then, a lateral support frame is fixed respectively on the top sides of the support arms, having a tubular elongate shaft rod pivotally fitted inside and provided with a combining base protruding forward. Besides, the engine supporter is provided with a pair of rear wheel shaft supporters on opposite rear ends.

The auxiliary hanger having a width equal to that of the car frame is fixedly provided with short shaft rods on opposite rear ends and has its front end shrunk into a rod fixed with a short shaft rod at the end.

In assembling, firstly, two combining members of the upper connecting rod of the engine hanger are respectively inserted in the support lugs on the front end of the car frame and the fixing plate covers up the combining member, and then is secured with the fastening member and the support lug, letting the connecting rod of the engine hanger and the engine supporter extending in the interior space of the car frame. Next, the auxiliary hanger has its rear short shaft rods pivotally and respectively fitted in the pivotal bases on the rear end of the car frame and its front short shaft rod pivotally fitted with the combining base of the elongate shaft rod of the engine supporter. Lastly, the connecting rod under the engine hanger, the connecting studs in front of the engine supporter and the connecting lugs before the support arms of the engine supporter are respectively and pivotally assembled on the casing of an engine positioned in the interior space of the car frame to finish the engine suspension device of a beach buggy. Then the beach buggy has an effect of shock absorption, lessening vibration, and preventing the transmission chain from loosened or worn out and a beach buggy from twisting sideward.

BRIEF DESCRIPTION OF DRAWINGS

This invention will be better understood by referring to the accompanying drawings, wherein.

DETAILED DESCRIPTION OF THE PREFERRED EMBODIMENT

Figure 3:
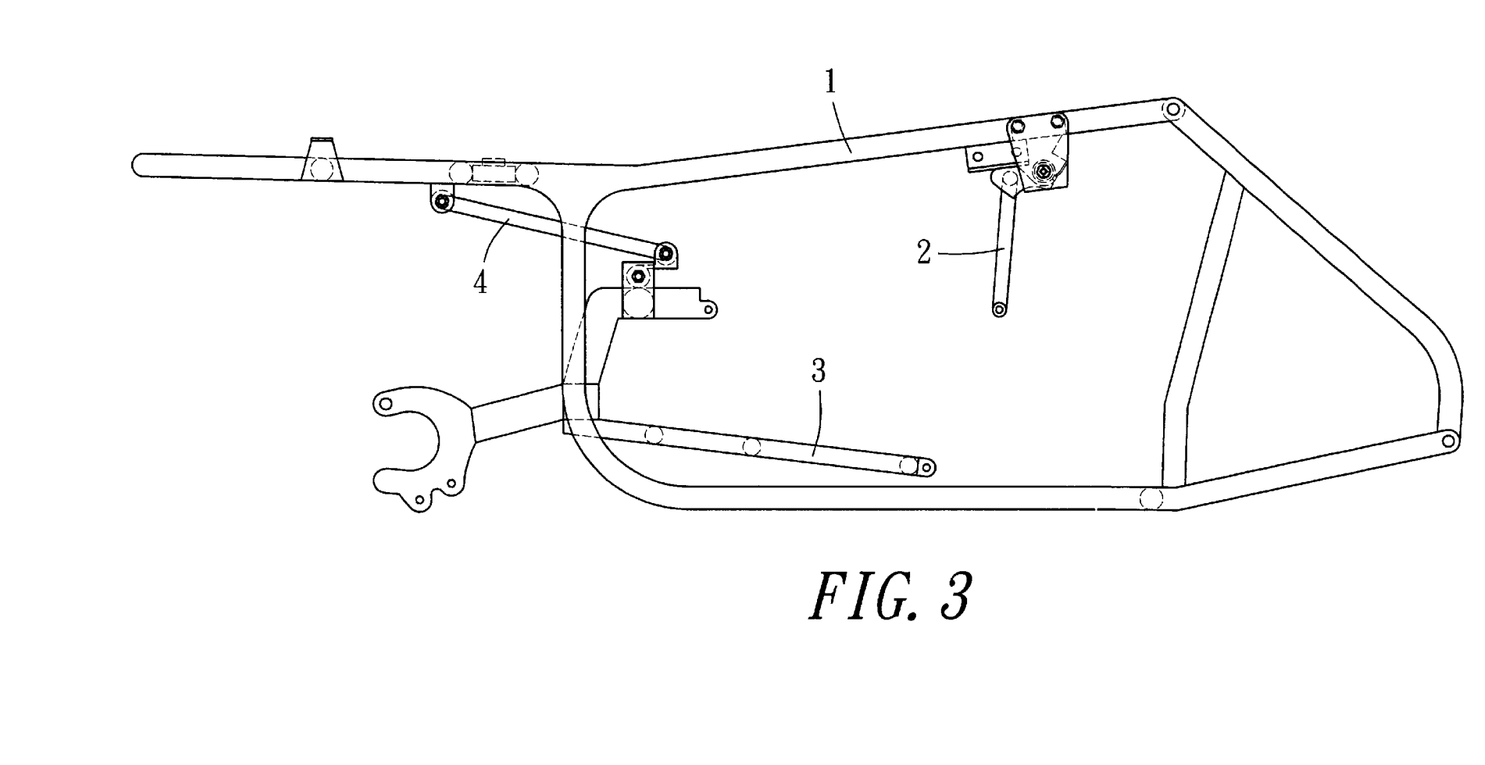
FIG. 3 is a cross-sectional view of the car frame of a beach buggy in the present invention.

A preferred embodiment of an engine suspension device of a beach buggy in the present invention, as shown in FIG. 3, includes a car frame 1, an engine hanger 2, an engine supporter 3 and an auxiliary hanger 4 as main components combined together.

Figure 4:
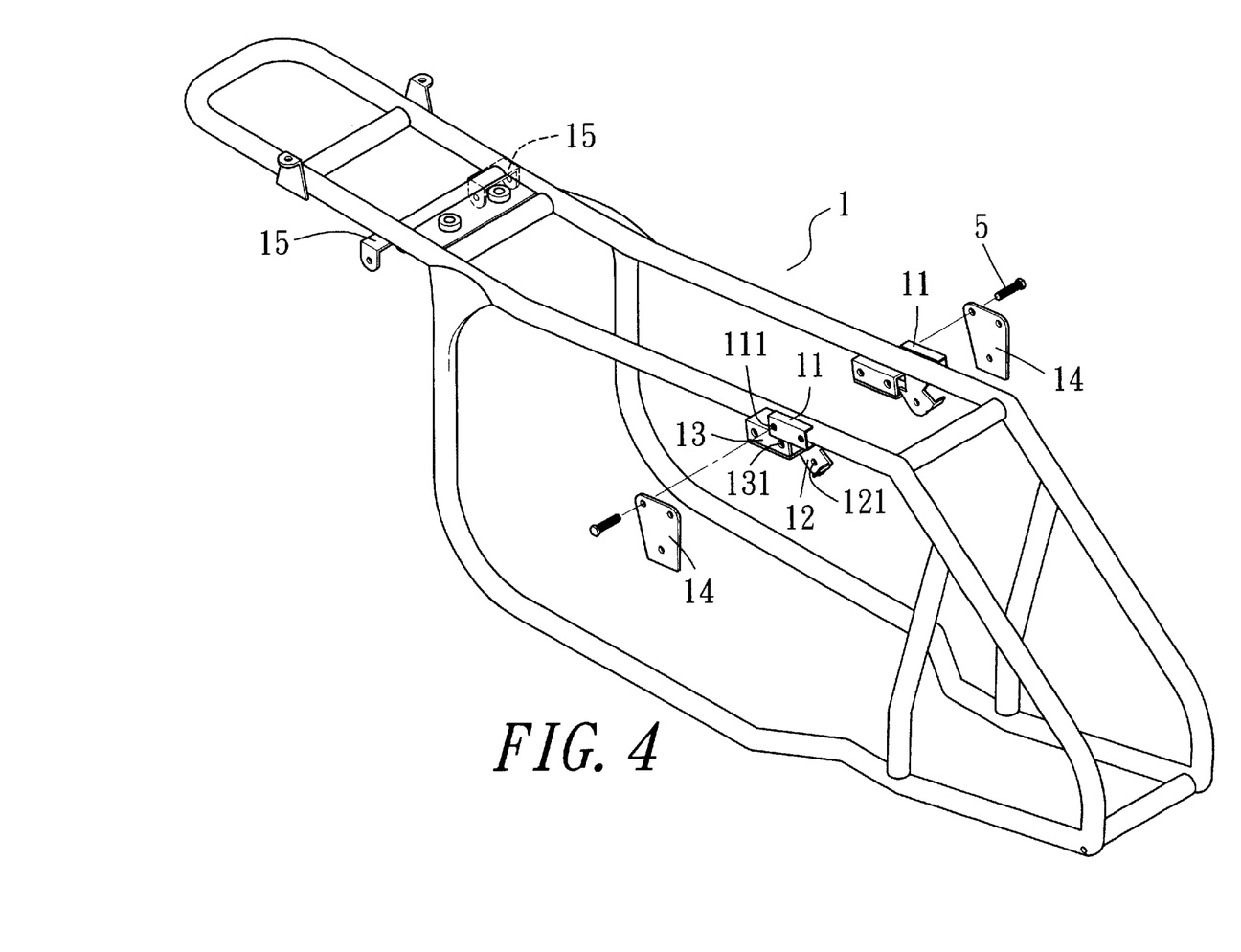
FIG. 4 is a perspective view of the car frame of a beach buggy in the present invention.

The car frame 1 is composed of a plurality of metal rods welded together in parallel, as shown in FIG. 4, forming a space inside for placing an engine 6. The car frame 1 has a protruding-out hollow fastening member 11 with threaded holes 111 respectively fixed on an outer side near the front ends of top rods. Then a support lug 12 with a center through hole 121 is positioned under the fastening member 11, a rectangular block 13 fixed with a rubber bumper 131 at the bottom positioned behind the support lug 12, and a fixing plate 14 having through holes 141 is to be screwed with the fastening member 11. The car frame 1 further has a pivotal base 15 with a downward opening respectively fixed near the rear ends of top rods.

Figure 5:
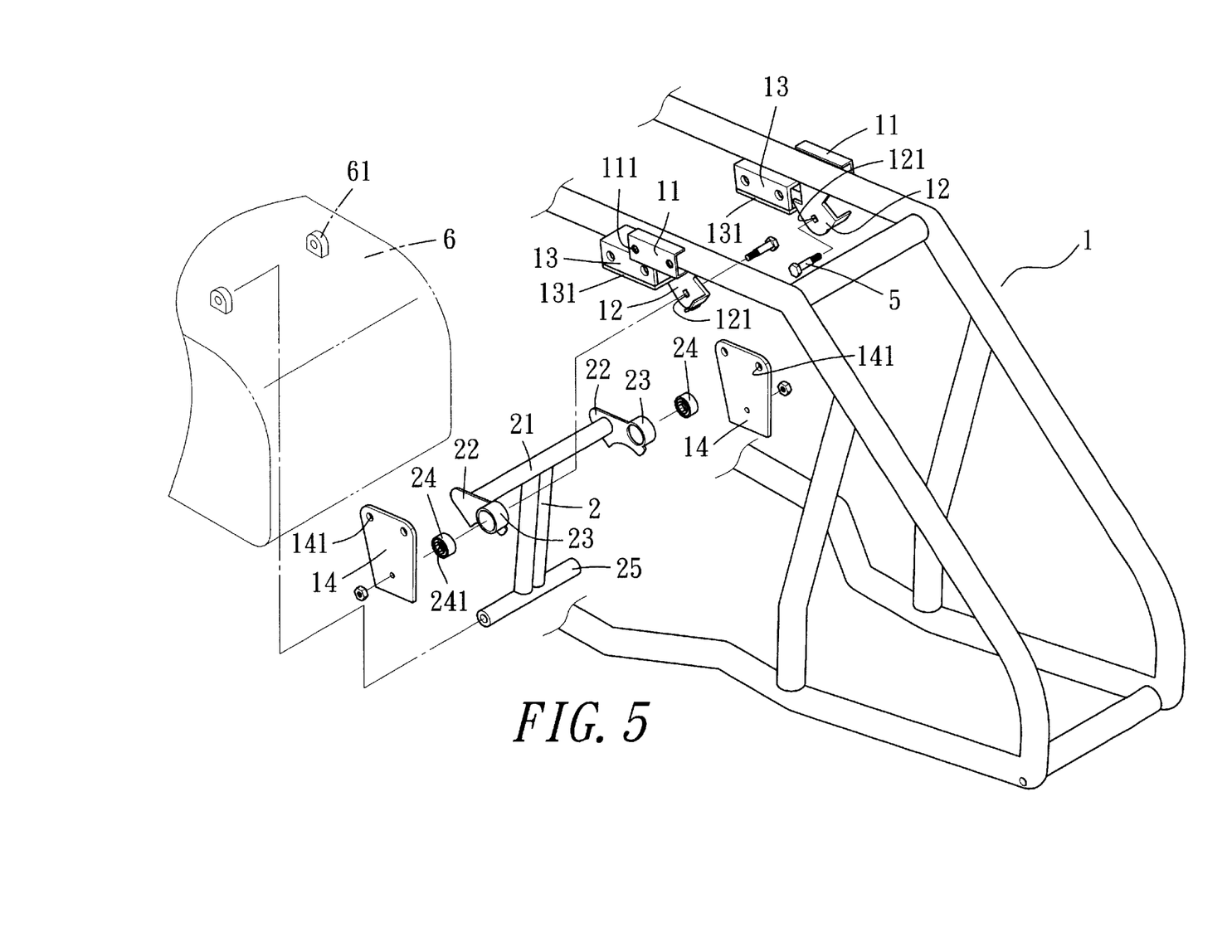
FIG. 5 is an exploded perspective view of the car frame in the present invention.

The engine hanger 2 is provided with an upper connecting rod 21 having a width equal to that of the car frame 1, as shown in FIG. 5. The upper connecting rod 21 has its opposite ends fixed with a stop plate 22 having a hollow combining member 23 fixed on a front side to be received in the support lug 12 of the car frame 1, and the hollow combining member 23 is stuffed inside with a rubber-made insert member 24 having a through hole. The engine hanger 2 is further provided with a laterally hollow combining rod 25 at the bottom.

Figure 6:
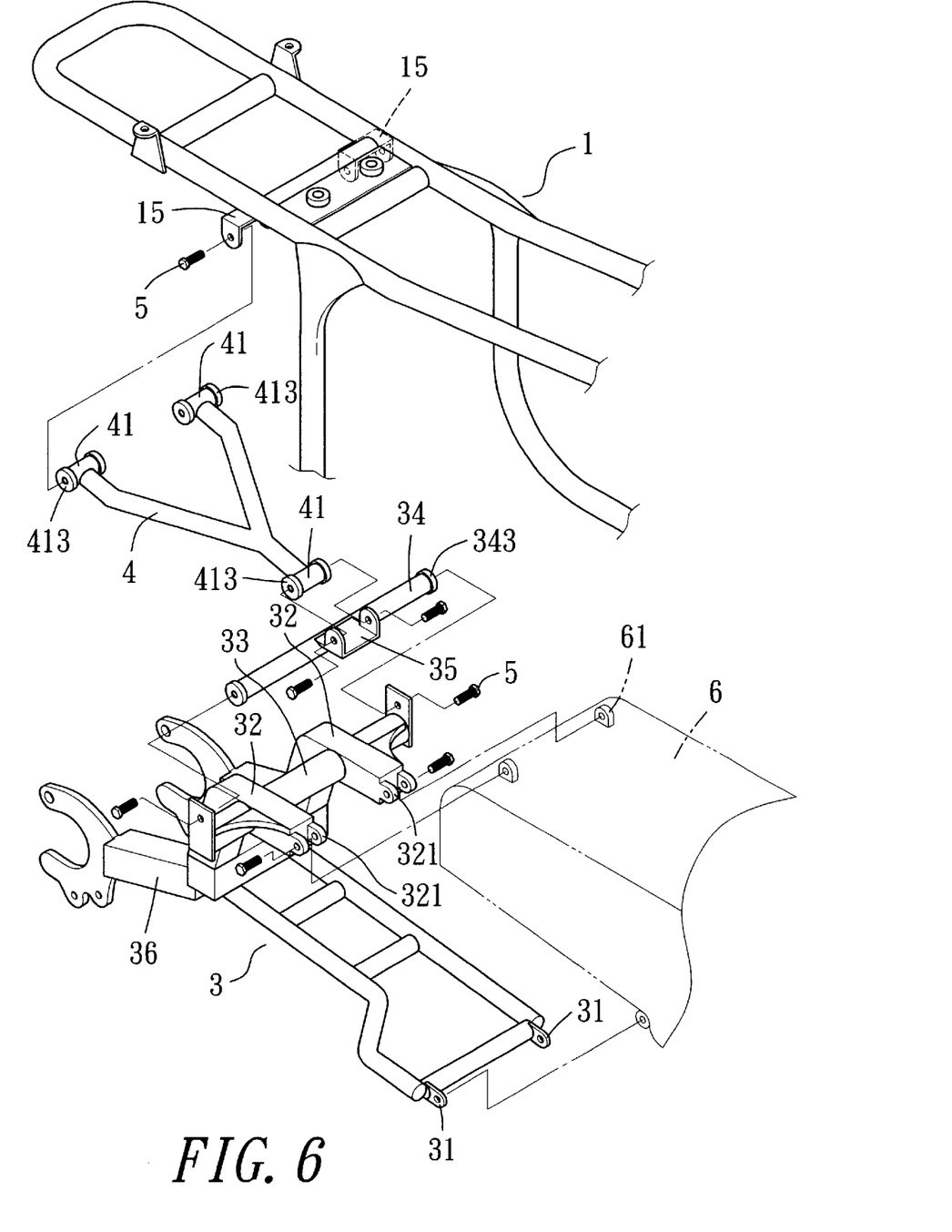
FIG. 6 is an exploded perspective view of the engine suspension device in the present invention.
Figure 7:
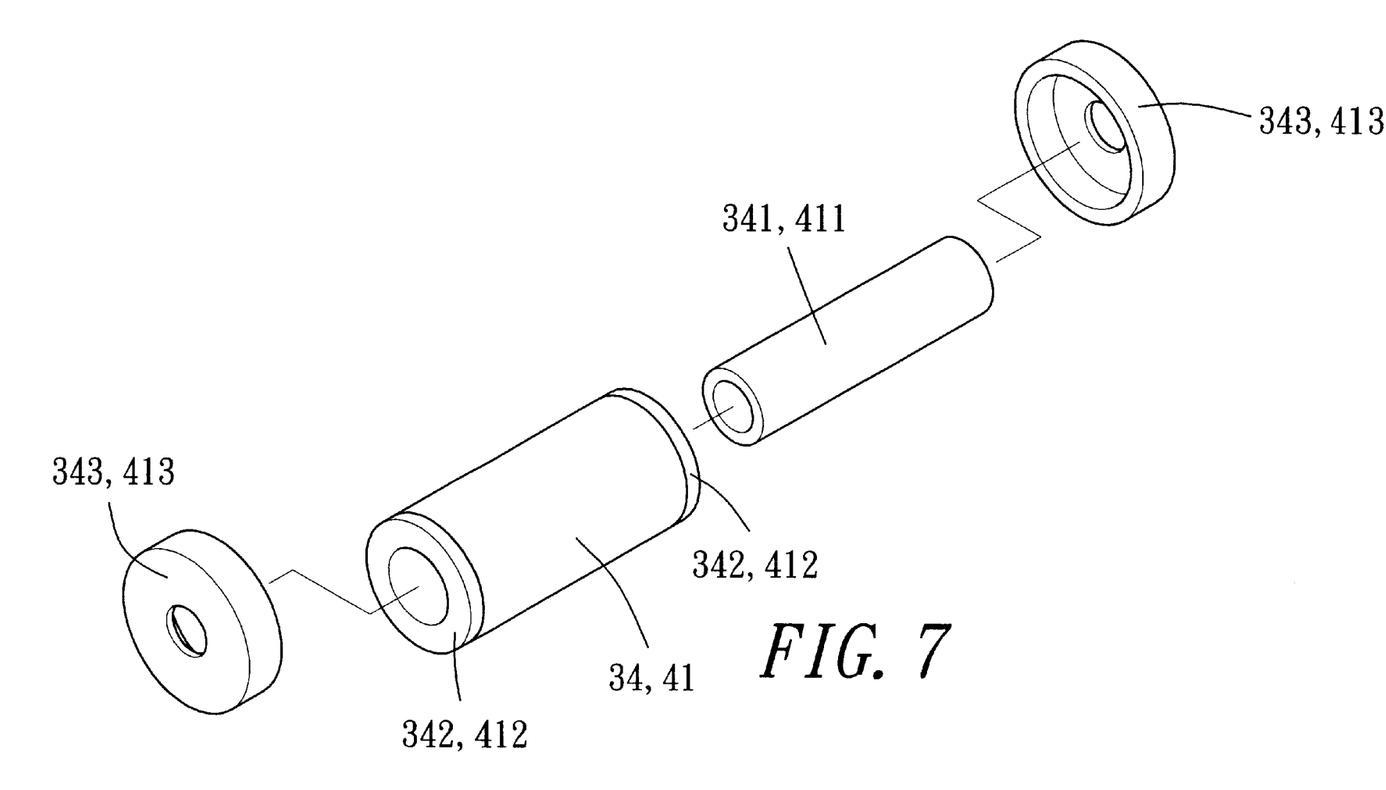
FIG. 7 is an exploded perspective view of an elongate shaft rod and short shaft rods of the engine suspension device in the present invention.

The engine supporter 3 extends forward, forming with two rods having a connecting stud 31 fixed at opposite front ends, as shown in FIG. 6 and is secured on the top side by means of a pair of support arms 32 extending forward above the rods. The support arms 32 are respectively formed with connecting lugs 321 at a front end and fixed on top with a lateral support frame 33 having a tubular elongate shaft rod 34 fitted pivotally inside, as shown in FIG. 7. Besides, the elongate shaft rod 34 has a hollow separating tube 341 stuffed inside serving as a bearing, a lubricant keeping member 342 with a seal cover 343 provided respectively at opposite ends and a combining base 35 protruding forward and fixed on a front side. The engine supporter 3 further has a pair of rear wheel shaft supporters 36 secured at the rear end.

The auxiliary hanger 4 has width equal to the car frame 1, a short shaft rod 41 fixed respectively on the rear opposite ends and its front portion shrunk into a rod and fixed with a short shaft rod 41 at its end. The shaft rod 41 is a hollow interior stuffed with a hollow separating tube 411 serving as a bearing and has a lubricant keeping member 412 provided with a seal cover 413 respectively at the opposite ends, as shown in FIG.7.

Figure 8:
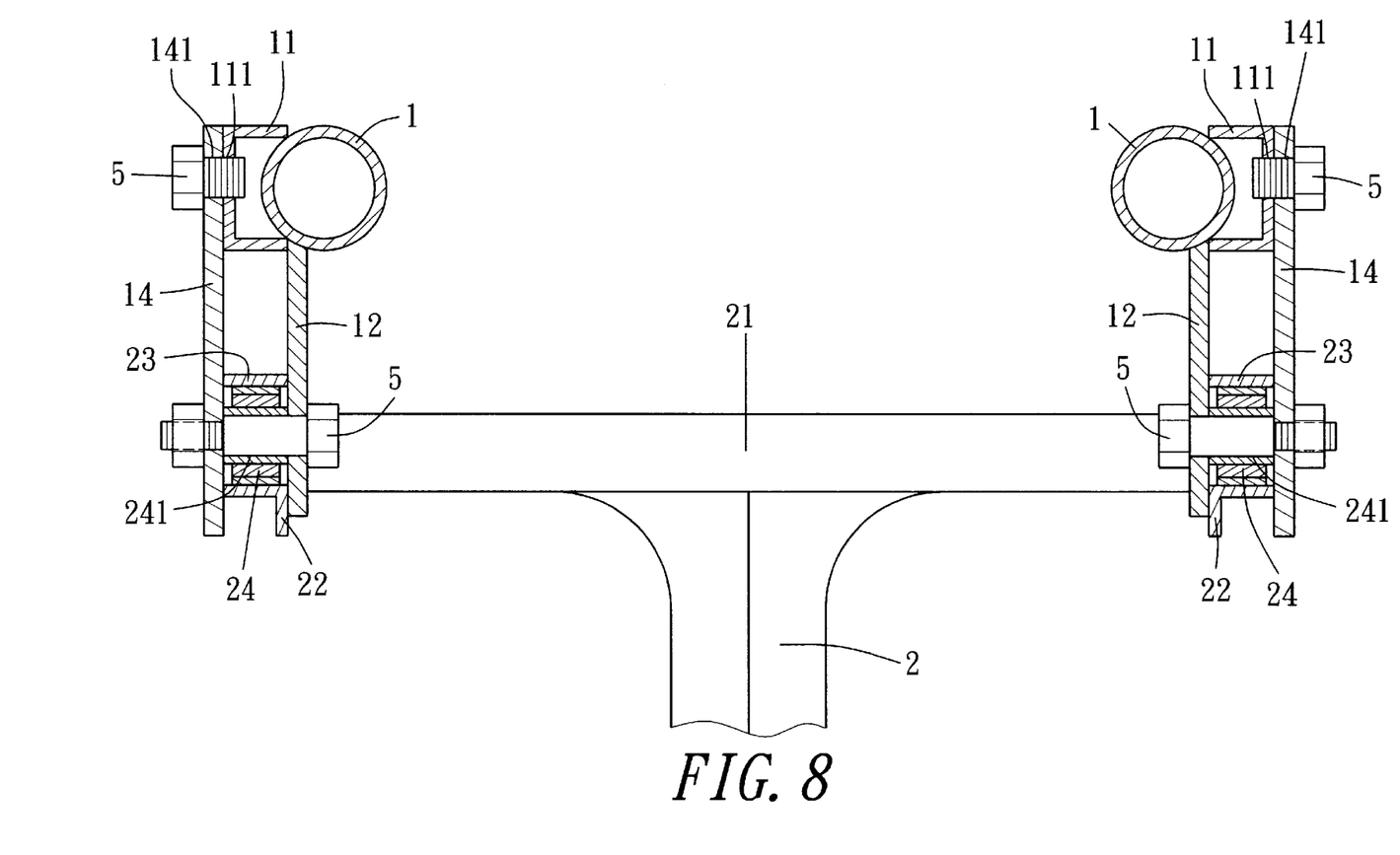
FIG. 8 is a side cross-sectional view of the car frame assembled with the engine hanger the engine in the present invention.

In assembling, firstly, the combining members 23 on the opposite ends of the upper connecting rod 21 of the engine hanger 2 are inserted into the support lugs 12 on the front end of the car frame 1, as shown in FIG. 8. Then, the fixing plate 14 covers up the outer side of the combining members 23 and is fixedly screwed with the fastening members 11 by means of bolts 5 respectively screwing through the threaded holes of the fastening members 11 and the through holes 121, 241 and 141 of the support lug 12, of the insert member 24 and of the fixing plate 14 so as to securely combine the engine hanger 2 with the car frame 1 together.

Figure 9:
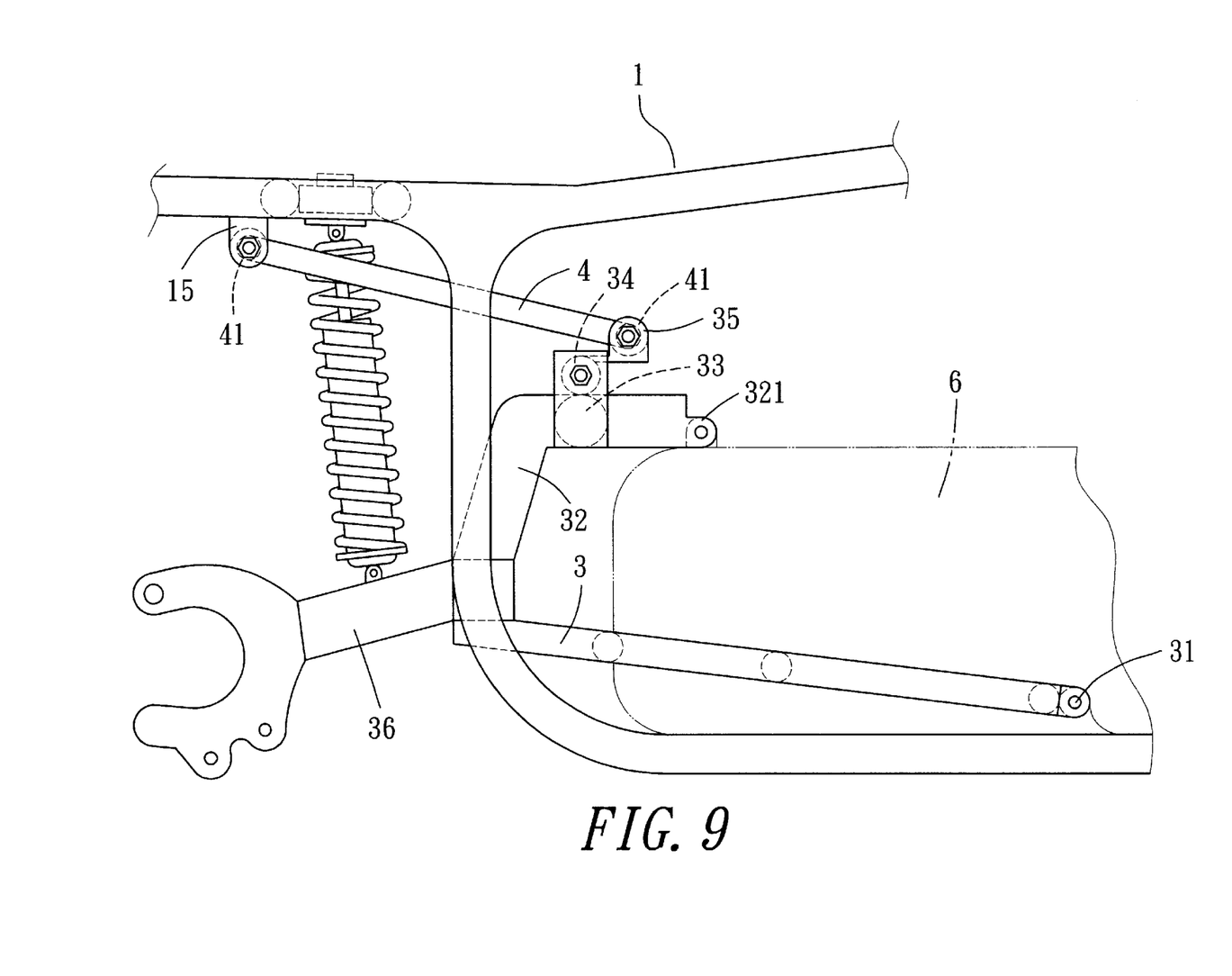
FIG. 9 is a cross-sectional view of the car frame assembled with the engine supporter the in the present invention.

Next, the short shaft rod 41 at the front end of the auxiliary hanger 4 is pivotally fitted with the combining base 35 of the elongate shaft rod 34 on the engine supporter 3 by bolts 5. Lastly, the short shaft rods 41 at the rear ends of the auxiliary hanger 4 are pivotally combined with the pivotal base 15 at the rear end of the car frame 1, as shown in FIG. 9, to finish the engine suspension device of a beach buggy, with the combining rod 25 of the engine hanger 2 and the engine supporter 3 extending in the interior space of the car frame 1.

Figure 10:
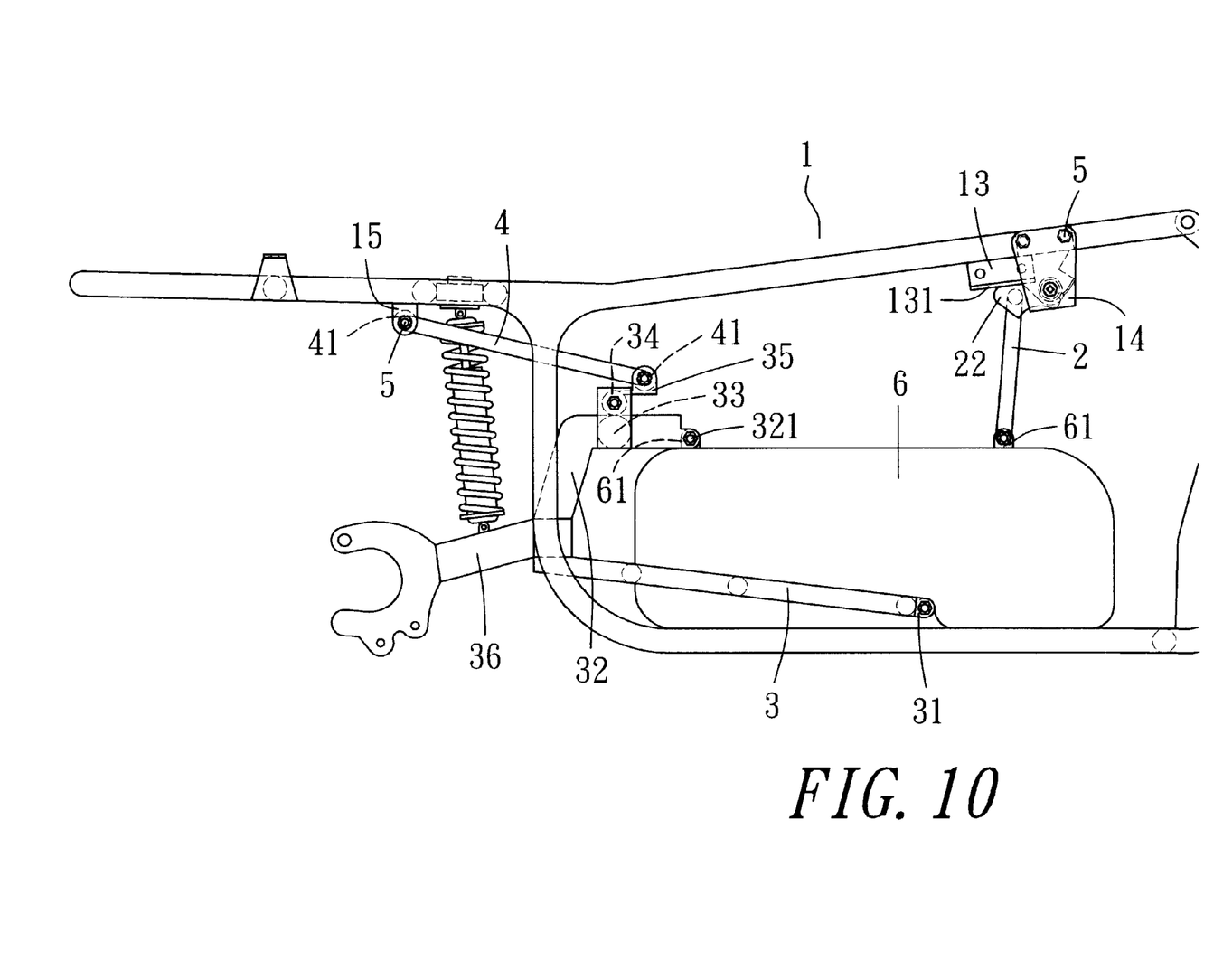
FIG. 10 is a cross-sectional view of the engine suspension device assembled with an engine in the present invention.

As for fixing an engine with the suspension device of this invention, as shown in FIG. 10, the engine 6 is first placed in the interior space of the car frame 1 and then the combining rod 25 under the engine hanger 2 is pivotally fitted between the lugs on the top of the casing of the engine 6 and the connecting studs 31 at the front end of the engine supporter 3 are pivotally combined with the lugs 6 at bottom of the casing of the engine 6 and then the connecting lugs 321 of the support arms 32 are pivotally connected with the lugs 61 on the rear side of the casing of the engine 6, accordingly making the engine suspending in the interior space of the car frame 1.

Figure 11:
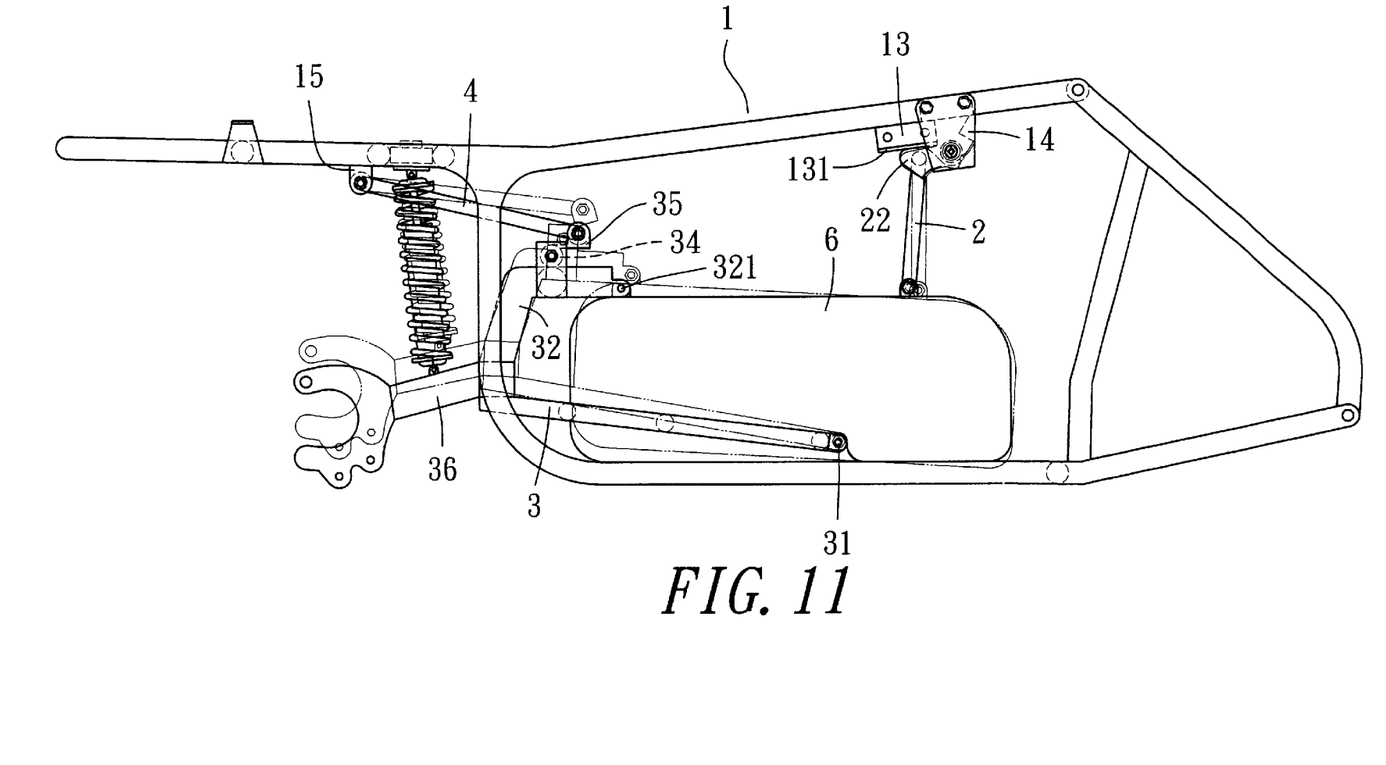
FIG. 11 is a cross-sectional view of the engine suspension device in an operating condition in the present invention.
Figure 12:
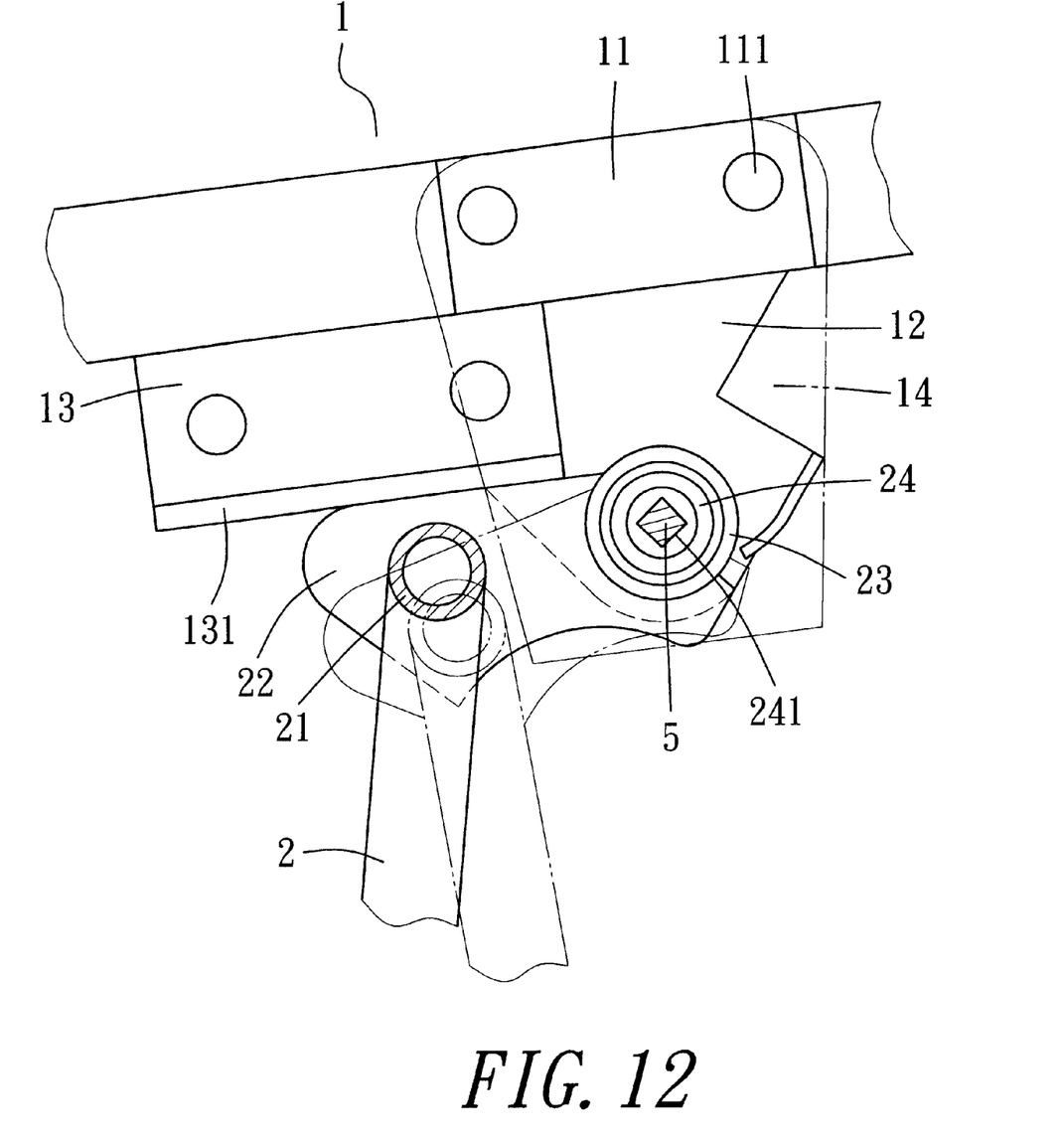
FIG. 12 is a partially magnified view of FIG. 11.

Thus, when the engine 6 rotates and produces vibration, this vibration will not be transmitted to the car frame 1 but completely absorbed by the engine hanger 2 and the engine supporter 3 as well as by the auxiliary hanger 4, as shown in FIG. 11. In case the engine rotates at a high speed and produces huge vibration, the engine hanger 2 will swing bias between the support lugs 12 of the car frame 1 and the lugs 61 of the engine 6 and the bias swinging will force the insert members 24 in the combining members 23 to twist around and subsequently make the engine hanger 2 retrieve its original position by the resilience of the rubber-made insert members 24. At the same time, the auxiliary hanger 4 swings biasly between the pivotal bases 15 of the car frame 1 and the combining base 35 of the engine supporter 3, which also swings biasly with the elongate shaft rod 34 as a fulcrum, so that the vibration of the engine 6 is possible to be transmitted to the car frame 1. Besides, the block 13 on the car frame 1 has a function of a buffer. In case the engine vibrates to make the engine hanger 2 swing in a large range, the stop plates 22 behind the combining member 23 will contact with the rubber bumper 131 under the stop block 13 so as to prevent the components from bumping each other and damaged.

In accordance with the design described above, this invention has the following advantages.

1. The engine 6 is not directly fixed on the car frame 1, therefore the vibration produced by the engine 6 will not be transmitted to the car frame 1 but absorbed by the engine hanger 2 and the engine supporter 3 as well as by the auxiliary hanger 4, letting a rider not feel uncomfortable, no matter how fast or how long the rider rides on the beach buggy.

2. The engine 6 has its bottom side and rear side directly assembled on the engine supporter 3, so the distance between the shaft of the engine 6 and the rear wheel shaft will remain unchanged despite the vibration, preventing the transmission chain from loosened and worn out and thus prolonging its service life.

3. The engine supporter 3 has its top side pivotally combined with the bottom portion of the auxiliary hanger 4 and the engine supporter frame extends to the interior space of the car frame 1, forming a second subsidiary frame to strengthen the car frame 1 of the beach buggy and preventing the car frame 1 from twisting sideward and from overturning when making a turn.

While the preferred embodiment of the invention has been described above, it will be recognized and understood that various modifications may be made therein and the appended claims are intended to cover all such modifications that may fall within the spirit and scope of the invention.

We claim:

1. An engine suspension device of a beach buggy comprising:

a car frame composed of a plurality of metal rods welded together and forming an interior space, said car frame having a protruding-out fastening member with threaded holes fixed on opposite outer sides near a front end, said fastening member provided with a support lug having a through hole, with a rectangular block secured behind said support lug, said fastening member and said support lug having their outer sides fixedly screwed with a fixing plate, said car frame further having a pivotal base with a downward opening oppositely positioned near the rear end of its top rods:

an engine hanger provided with an upper connecting rod having a stop plate fixed on the opposite ends, each said stop plate having a combining member at its front side to be received in said support lug of said car frame, said engine hanger further having a laterally hollow connecting rod provided at the bottom:

an engine supporter formed with two rods extending forward, each said rod provided with a connecting stud protruding out at the front end, said engine supporter having a pair of support arms secured on top and extending forward above said rods, each said support arm having connecting lugs formed at the front end and a lateral support frame fixed on top, said lateral support frame pivotally fitted inside with a tubular elongate shaft rod fixed with a combining base protruding forward, said engine supporter further provided fixedly with a pair of rear wheel shaft supports at the opposite rear ends:

an auxiliary hanger having a width equal to said car frame, two short shaft rods provided on the opposite rear ends, said auxiliary hanger having its front end shrunk into a rod body having a short shaft rod fixed at an end:

said combining members of said upper connecting rod of said engine hanger respectively inserted in said support lugs of said car frame, said fixing plate covering up said combining member and respectively secured with said fastening member and said support lug of said car frame, said upper connecting rod of said engine hanger and said engine supporter respectively extending into the interior space of said car frame, said short shaft rods on the opposite rear ends of said auxiliary hanger pivotally fitted with said pivotal base of said car frame and said short shaft rod on the front end pivotally combined with said combining base on the top side of the said engine supporter, said upper connecting rod and said connecting lugs of said, support arms of said engine supporter respectively and pivotally combined with the casing of said engine.

2. The engine suspension device of a beach buggy as claimed in claim 1, wherein each said rectangular block has its bottom edge fixed with a rubber bumper.

3. The engine suspension device of a beach buggy as claimed in claim 1, wherein said elongate shaft rod of said engine supporter and said short shaft rods of said auxiliary hanger are hollow and respectively stuffed inside with a hollow separating tube serving as a bearing and provided at opposite ends with a lubricant keeping member having a seal cover.

4. The engine suspension device of a beach buggy as claimed in claim 1, wherein said combining members of said engine hanger are respectively stuffed inside with a rubber-made insert member having a through hole to activate said engine hanger to twist and recover.

* * * * *